March 29, 1932. J. E. COYLE 1,851,001
GUIDE MECHANISM FOR USE IN CONNECTION WITH WELDING MACHINES AND THE LIKE
Filed July 18, 1929 2 Sheets-Sheet 2
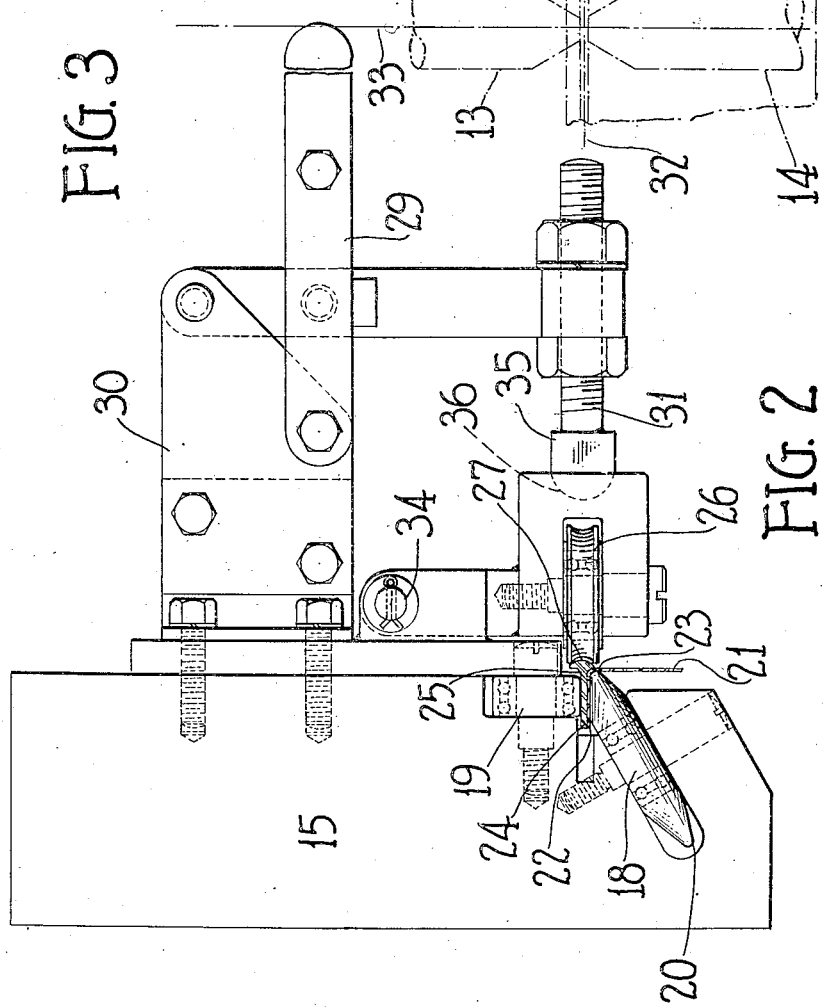
INVENTOR.
JAMES EDWARD COYLE
BY
ATTORNEY.

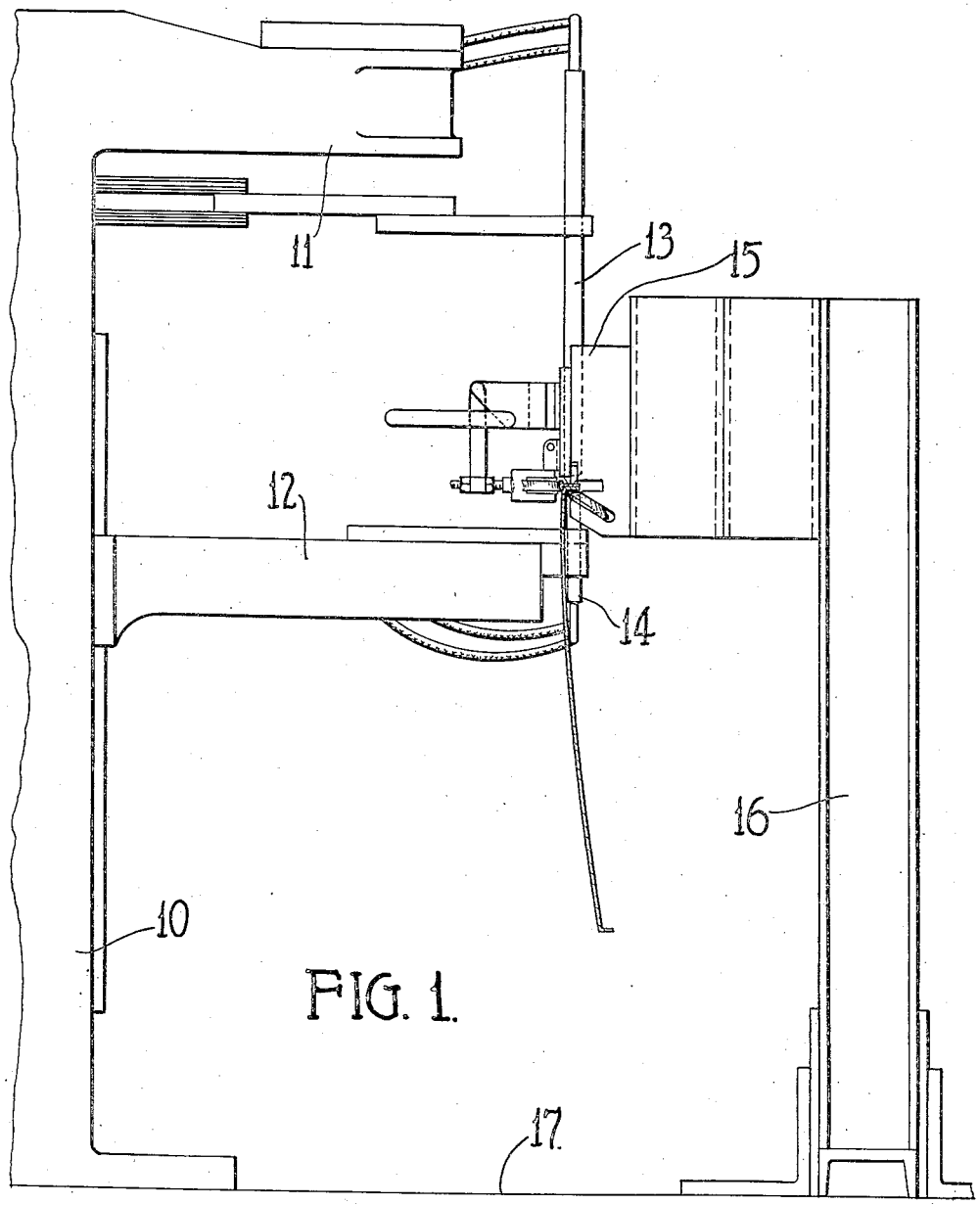

Patented Mar. 29, 1932

1,851,001

UNITED STATES PATENT OFFICE

JAMES EDWARD COYLE, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

GUIDE MECHANISM FOR USE IN CONNECTION WITH WELDING MACHINES AND THE LIKE

Application filed July 18, 1929. Serial No. 379,223.

The greatest utility at present known to me for my invention is the spot welding together of flanged work pieces with their flanges nested together or otherwise in appropriate alignment, but especially when they are nested together. The two work pieces upon which I have most commonly utilized my invention are a sheet metal automobile body panel having a flanged connection with a flanged finishing bead. Flange finising beads of T-cross section are very commonly used in automobile body work for finishing joints. The head of the T is constituted by the bead and the body by the flange. The flange is interposed between other flanges constituting the joint between adjoining panels and the bead exteriorly overlies and covers the joint between them. The flanges are commonly spot welded together, but they may be otherwise secured.

It has been the common practice to hand lay these parts together or to clamp them together in a fixed jig and then spot weld them or otherwise secure them.

These methods are all suited to accuracy, close adherence to line, and snug joints. Moreover, they lack general adaptability. Often the nature of the parts is such that they can be hand laid only by the application of inordinate force, and sometimes the force required exceeds that available by hand. Then a special jig is required for each different contour.

According to my invention I employ a system of guiding and forming rolls in combination with the spot welding electrodes. One at least of the rolls is provided with an angular engaging face, and engages the work in a plane diagonally of the angle of the flange of the work piece engaged. Another opposingly engages the flange of the other work piece to shape and bind the flanges together as the work progresses through the rolls. A third and removable and replaceable roll also opposes the first-named roll and engages the work to retain it between the two first-named rolls and to assistingly guide and form the work. More specifically the angle faced roll engages the automobile body panel diagonally of the angle of its flange from within, the opposed flange engaging roll engages the flanged body of the T molding normally of its flange, and presses the two flanges together between one of the faces of the angle faced roll and its own face, and the third removable and replaceable clamping roll engages the bead of the T molding, pressing the bead down upon the angle of the flange of the panel, thereby nesting the angle of the panel in the angle of the head of the molding, and furthermore, presses both work pieces in the plane of their flanges firmly between the opposed flange engaging rolls and firmly upon the apex of the angle faced roll. Engagement of the work by the guiding mechanism is substantially in the transverse plane of the electrode ends and immediately adjacent the axis of the electrodes, whereupon following the initial weld of the newly inserted work, the welding action of the machine coacts with the guiding and forming action of the rolls to accurately and efficiently lay the work pieces together and conform them to each other irrespective of ordinary irregularities of contour. In this coaction resides the method of my invention.

The particular embodiment of my invention utilized in the joining of body panels and T-moldings, is shown in the accompanying drawings, which is, of course, susceptible of other embodiments.

Fig. 1 is a general side elevation of a welding machine embodying my invention.

Fig. 2 is an enlarged side elevation of the guiding and forming mechanism per se.

Fig. 3 is a front elevation of the same, showing the work pieces and the welding electrodes in dotted outline.

The welding machine is of a commonly known type of spot welding machine. It comprises a main body 10 and laterally projecting super-imposed arms 11 and 12 which support in coacting relation, upper and lower axially aligned relatively reciprocable electrodes 13 and 14. Any of the known mechanism for reciprocating these electrodes may be used.

Immediately adjacent these electrodes, as clearly appears in Figs. 1 and 3, is located the guiding and forming mechanism. This comprises base block 15 supported from a pedestal 16 rising from the floor 17, but it may be otherwise supported, for example, directly from the pedestal 10 of the welding machine per se. Two relatively fixed opposed rolls 18 and 19 are supported on roller bearings indicated in dotted lines in the body of this block. The lower roll 18 is provided with an angular face in cross section, having an apex 20. The apex 20 engages the automobile body panel 21 constituting one of the work pieces diagonally of the angle between the body of the panel and its flange 22 by which it is to be joined to the other work piece. In fact, the apex 20 of the roll 18 engages in the apex 23 of the angle of the flange 22 with the body 21 of the panel. The opposing flange roll 19 has, in this instance a cylindrical engaging face and engages a flange 24 constituting the body of the T molding 25 normally, pressing it firmly against flange 22 and the opposing angular face of the roll 18.

The third roll 26 engages by a periphery of corresponding cross section, the curved exterior of the head 27 of the T molding. This is the bead of the molding. It engages it in the plane of the flanges 22 and 24. It forces the head 27 snugly down upon the apex 23 of the angle of flange 22, and snugly nests the angle of the flange 22 within the angle of the flange 24 and against the under side of the head 27, forcing flanges 22 and 24 home between the opposed flange engaging rolls 18 and 19, and snugly holds the apex 23 of the angle of the flange 22 down upon the apex 20 of the section of the face of roll 18.

This roll 26 coacting with the work and the rolls 18 and 19 is removable and replaceable through a clamping device to clamp the parts together and into coacting relation with the rolls. The clamping device comprises a manually operable toggle mechanism 29 of a well known type, supported from block 15 by bracket 30 and carrying the clamping roll 26 through an adjustable stem 31.

As clearly appears in Figs. 1 and 3, the guiding and forming rolls engage the work substantially in the transverse plane 32 of the engaging ends of the electrodes 13 and 14. The axis of roll 18 is at an acute angle to the axis 33 of the electrodes. The axis of roll 19 is substantially at right angles to the axis 33, and the axis of roll 26 is substantially parallel to axis 33. Conversely, the planes of the rolls themselves are, respectively, that of roll 18 lying at an acute angle to the axis 33 and the plane 32, that of roll 19, parallel to the axis 33 and at right angles to plane 32, and that of roll 26 parallel to plane 32 at right angles to axis 33.

So organized, when the work clamp 29 is released and roll 26 moved outwardly and upwardly about its pivotal support on bracket 30, flange 22 of a panel 21 may be entered between rolls 18 and 19 and supported on the angular face of roll 18, the end of a T molding 25 may have its flange 24 laid down upon flange 22 and also entered between rolls 18 and 19, clamp 29 may be closed, and roll 26 engaged with head 27 forcing the parts into the snug relation shown in Fig. 1 in which the parts bear upon and coact with each other, as described. Thereupon, being moved by hand or by power through the rolls and between the electrodes, the first spot weld may be made through reciprocation of the electrodes 13, 14 and proper application of current. This made, there is immediately a coaction between the welds as made, and the guiding and forming mechanism. Irrespective of the considerable variations in contour and curvature and width and thickness of flanges 22 and 24, the parts from which they emanate, the T molding which may be initially in rectilinear form, is laid down accurately and efficiently upon the panel 21 and its flange 22, perfectly conforming to its shape, and welded in place as the work is progressed.

It will be observed that the clamp roller 26 is suspended from a pivot 34 carried by the base block and that it has no rigid connection with the stud 31. Instead the head 35 of stud 31 bears in a socket 36 connected with roll 26. Thus, when the clamp 29 is open, the head 35 leaves the socket 36, permitting the roll 26 to hang suspended from roll 34. It may be swung about its pivot 34 to any degree desired in the entry of the work between the rolls.

The annexed claims should protect to me all modifications of my invention which fall within its generic spirit.

What I claim is:

1. A guide mechanism for flanged work pieces to be joined together through their flanges in nested relation comprising opposed rolls having work-engaging faces exerting pressure diagonally of the angle of the flanges, and also perpendicularly of the flanges to force the work pieces into intimate nested relation.

2. A guide mechanism for flanged work pieces to be secured together through their flanges in nested relation, comprising two guide rolls engaging the one piece, the one parallel to the flange and the other normal to the flange, and a guide roll engaging the other piece upon a diagonal of the angle, in such manner that it opposes both of the first-named rolls.

3. A guide mechanism for flanged sheet metal panel and a flanged finish bead to be joined together in nested relation through the flange, comprising a roll engaging the bead, a roll engaging the flange, and a diagonally disposed roll engaging the panel in the angle between the bead and the flange.

4. A guide mechanism comprising guide rolls at right angles to each other, and an opposing roll and having faces adapted respectively to engage the arms of angular work parts in a plane diagonally of the right angle and having faces adapted to engage the opposite sides of the arms of the work parts to force the work parts into intimate nested relation.

5. A guide mechanism for flanged work parts to be secured together through the flanges, comprising opposed flange engaging rolls, and a removable and replaceable clamping roll having faces engaging the work to force the flanges between the opposed flange engaging rolls and the body of the work parts adjacent said flanges in intimate contact.

6. A guide mechanism for securing flanged bodies to flanged metal panels comprising a bead flange engaging roll engaging normally of the bead flange, and work flange engaging roll engaging diagonally of the panel flange, and a removable and replaceable roll engaging the bead and pressing the same down upon the panel.

7. In combination, a welding machine having a reciprocating welding electrode, engaging the work in the transverse plane of the electrode ends immediately adjacent the axis of the electrodes and comprising work clamping rollers in planes at an acute angle to each other, exerting work clamping pressure in a line parallel to the axis of the electrodes, and a clamping roll to clamp the work between the first-named rolls engaging the work in the transverse plane of the electrode ends movable and replaceable to permit insertion of the work.

8. In combination, a guiding and forming mechanism for work parts to be secured together through their flanges, comprising opposed rolls engaging the flanges and one at least of which is provided with an angular face engaging diagonally within the angle of a flange, and a clamping roll coacting with the opposed rolls and exerting pressure to hold the apex of the angle upon the angular face of the angularly faced roll.

In testimony whereof I hereunto affix my signature.

JAMES EDWARD COYLE.